(12) United States Patent
Kuper et al.

(10) Patent No.: US 11,908,190 B2
(45) Date of Patent: Feb. 20, 2024

(54) GAME MONITORING

(71) Applicant: WINGFIELD GMBH, Hannover (DE)

(72) Inventors: Henri Kuper, Hannover (DE); Julius Burlage, Hannover (DE); Jaan Brunken, Hannover (DE); Maik Burlage, Hannover (DE)

(73) Assignee: WINGFIELD GMBH, Hannover (DE)

( * ) Notice: Subject to any disclaimer, the term of this patent is extended or adjusted under 35 U.S.C. 154(b) by 534 days.

(21) Appl. No.: 17/261,591

(22) PCT Filed: Aug. 2, 2019

(86) PCT No.: PCT/EP2019/070875
§ 371 (c)(1),
(2) Date: Jan. 20, 2021

(87) PCT Pub. No.: WO2020/030542
PCT Pub. Date: Feb. 13, 2020

(65) Prior Publication Data
US 2021/0271889 A1 Sep. 2, 2021

(30) Foreign Application Priority Data
Aug. 7, 2018 (DE) .................. 10 2018 119 170.7

(51) Int. Cl.
*G06V 20/40* (2022.01)
*G06T 7/194* (2017.01)
*G06T 7/254* (2017.01)

(52) U.S. Cl.
CPC .............. *G06V 20/42* (2022.01); *G06T 7/194* (2017.01); *G06T 7/254* (2017.01); *G06T 2207/30224* (2013.01); *G06T 2207/30228* (2013.01); *G06T 2207/30241* (2013.01)

(58) Field of Classification Search
CPC ..................... G06T 7/194; G06T 7/254; G06T 2207/30224; G06T 2207/30228; G06T 2207/30241
See application file for complete search history.

(56) References Cited

U.S. PATENT DOCUMENTS

| | | | |
|---|---|---|---|
| 6,141,041 A | 10/2000 | Carlbom et al. | |
| 6,991,230 B1 * | 1/2006 | Shoemaker | A63F 9/02 273/108 |
| 9,737,784 B1 | 8/2017 | Kliebhan et al. | |
| 10,143,907 B2 | 12/2018 | Gentil | |

(Continued)

FOREIGN PATENT DOCUMENTS

| | | |
|---|---|---|
| EP | 2657924 A1 | 11/2018 |
| WO | 2013124856 A1 | 8/2013 |
| WO | 2017100465 A1 | 6/2017 |

OTHER PUBLICATIONS

Yan et al., "Automatic annotation of tennis games: An integration of audio, vision, and learning," Image and Vision Computing, 32 (2014): 896-903. [Date accessed: Jan. 20, 2021].

(Continued)

*Primary Examiner* — Diane D Mizrahi
(74) *Attorney, Agent, or Firm* — Michael J. Feigin, Esq.; Feigin and Fridman LLC

(57) ABSTRACT

The present invention relates to a device, a system and a method for tracking at least one object and player on a playing field/court and/or for monitoring the course of the game.

8 Claims, 3 Drawing Sheets

(56) References Cited

U.S. PATENT DOCUMENTS

Figure 1:
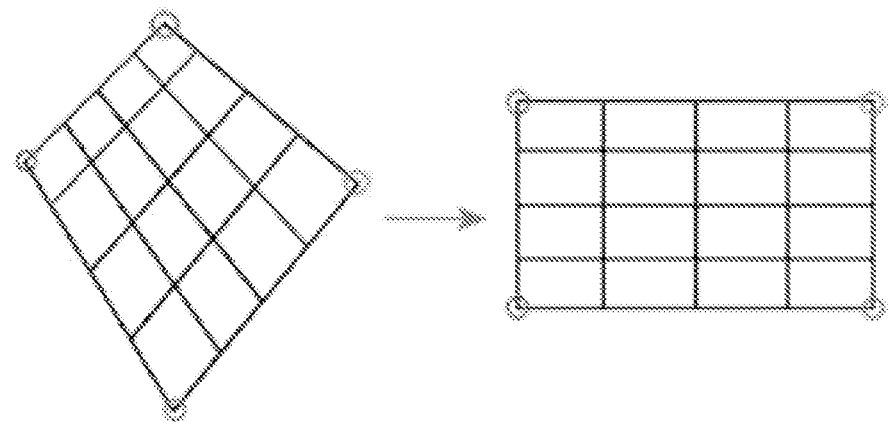

2015/0018990 A1 1/2015 Shachar
2018/0154232 A1 6/2018 Gentil

OTHER PUBLICATIONS

Jahne, "Digitale Bildverabeitung und Bildgewinnung," Springer Vieweg, ISBN 978-3-642-04951-4 [Date accessed: Jan. 20, 2021].
International Search Report, International application No. PCT/EP2019/070875, dated Oct. 23, 2019.

\* cited by examiner

GAME MONITORING

BRIEF SUMMARY OF THE INVENTION

Society without sporting activities for physical fitness is virtually unimaginable. However, many sports persons want not just to participate in sport, but to get better in their corresponding type of sport, in order to be competitive in competition events. In this case, in many types of sport the lack of meaningful data regarding a person's own performance poses a major problem since without such data mistakes and potentials for improvement can be found only with difficulty.

Activity monitoring systems, for example for ball sports such as soccer, are known, and comprise for example sensors that are incorporated into the ball and recognize the movements thereof. Said sensors can ascertain the trajectory and/or the position of the ball for example with the aid of a magnetic field, as explained in EP 2 657 924 A1 for example.

Further monitoring and/or information systems in the area of ball sports or racket sports are so-called smartcourt systems. However, tracking the movement of the usually fast objects on the playing field/court is very difficult and complicated, as a result of which in many cases complex systems are used which enable tracking of the object on the playing field/court and in 3D space. As a result, inter alia decisions in the game, such as "line calls" in tennis, for example, can be made in real time or statistics regarding the course of a sports event can be compiled. These complex systems often comprise a plurality of cameras and/or movable cameras that enable the tracking of an object, such as the ball, for example.

The smartcourt system in WO 2013/124856 A1 for example comprises a multiplicity of video cameras installed with rigid positioning. The image information from the different camera perspectives is used to generate a 3D model of the court, the ball and the players. On the basis of the movements captured therein, conclusions are drawn regarding the type of stroke, the ball speed and the hit points and can be viewed by the sports persons.

US9737784B1 concerns an electronic officiating system in which a plurality of camera arrays are mounted at different heights on the net post. Objects can be tracked since they pass through the fields of view of the individual arrays at different points in time, from which conclusions can be drawn regarding the movements of said objects.

WO 2017/100465 A1 discloses a system comprising a camera arranged in proximity to the post, which camera covers both sides of the court. In this case, a court map including the positioning of the court, of the net and/or of the camera is created by means of an autocalibration process. This enables the 2D coordinates from the video image generated during the match to be converted into 3D coordinates in the court map.

Current smartcourt solutions for ball games and/or racket games are therefore complex and expensive, as a result of which sports persons who do not train or play as professionals have no opportunity to analyze their games. Furthermore, systems with one camera perspective do not afford the possibility of analyzing types of strokes, for example in tennis. Moreover, existing systems are not able to ascertain the correct score if there is a difference between how the system captures the course of the game and the actual decisions of the players.

Therefore, the object of the present invention is to provide a system, a method and a computer program product that overcome the disadvantages mentioned above and give even amateur players an opportunity to monitor and analyze their games.

The present invention therefore relates to a method for game monitoring comprising the following steps:
a) determining the playing field/court;
b) recognizing at least one person on the playing field/court;
c) identifying objects on the playing field/court;
d) determining at least one trajectory;
wherein at least one event is identified by means of which the scores calculated in the course of the game are corrected by means of event-based result ascertainment (backward scoring) and the real final score of the game is output. In one embodiment, determining the playing field/court is effected by means of calibration, wherein individual points in a two-dimensional (2D)-image are assigned to a specific point in a two-dimensional (2D) model of the playing field/court. In one preferred embodiment, the calibration is effected by way of a homography matrix in which at least four points are used which correlate in the image and the model. In one particular preferred embodiment, these are four corner points of the playing field/court.

In one embodiment, recognizing persons on the playing field/court comprises the following steps:
a) generating at least one background image of a playing field/court;
b) generating a background model;
c) separating each background image from each currently recorded image which comprises a person by:
   i) determining an absolute difference between the background model and the currently recorded image, and
   ii) generating a foreground mask,
wherein the foreground mask is characterized in that all pixels belonging to the foreground have the value 255 and the pixels of the background have the value 0. In one preferred embodiment, pixels for which the difference is greater than a defined limit value are determined as foreground and pixels with a smaller difference are determined as background.

In a further embodiment of the present invention, the object on the playing field/court is identified by means of movements of each recorded image. In one preferred embodiment, determining the movement comprises the following steps:
a) creating difference images in respect of successive images;
b) calculating absolute difference images, in which a movement is visible at two places in the difference image, it preferably being a first position, at which the object was situated in the previous image, and a second position, at which the object is situated in the current image;
c) generating a first movement mask for the one first difference image and a second movement mask for the one second difference image; and
d) generating a final movement mask comprising the movements in the one first movement mask and the one second movement mask.

In one particularly preferred embodiment, the individual pixels of both movement masks are added by a bitwise AND operator.

In one embodiment, the trajectory path or the trajectory of the object is ascertained by the following steps being carried out:
a) fixing a first and a second starting point of a potential trajectory;

b) combining the potentially fixed starting points with all potential objects of the temporally following image;
c) checking each object as to whether an already existing trajectory is continued;
d) ascertaining positions of the object in successive images;
e) comparing the trajectories from a) and d);
f) determining a trajectory course; and
g) classifying the trajectory by determining a second trajectory following the trajectory.

In one preferred embodiment, pixels of objects which correlate with pixels of persons are not taken into account.

In a further embodiment, identifying events in the course of the game comprises the following steps:
a) capturing a trigger event;
b) comparing the position of at least one person and one object with the playing field/court model;
c) correlating with a database.

In one preferred embodiment, the events have been captured in a categorized data set in a previous step in order to carry out the correlating with the aid of an artificial intelligence trained with this data set.

In one embodiment of the present invention, correcting the score calculated in the course of the game comprises the following steps:
a) monitoring the possible scores during the game;
b) checking the compatibility of all possible scores with the detected events;
c) checking the plausibility of the remaining scores.

The present invention furthermore relates to a device for tracking at least one object and player on a playing field/court comprising:
a) an image recording system comprising
   i) at least one camera arranged in such a way that the entire playing field/court is captured;
   ii) at least one transmission module designed to store the data recorded by the camera and/or to transmit them to a computing unit, a storage means, or system;
   wherein the at least one camera and the at least one transmission module are attached to at least one net post;
b) a computing unit, comprising modules for
   iii) playing field/court ascertainment;
   iv) person recognition;
   v) object determination;
   vi) trajectory recognition;
   vii) event identification; and
   viii) event-based result ascertainment.

Furthermore, the present invention relates to a computer program for carrying out a method described above when the computer program is executed on a computer.

The present invention also relates to a computer program product
a) comprising a storage medium, on which a computer program described above is stored; and/or
b) which can be loaded directly into the internal memory of a digital computer and comprises software code sections that enable the steps in accordance with the method described above to be carried out when the product runs on a computer.

The object is furthermore characterized by the embodiments in the claims and described in greater detail by the explanations in the description, the examples and the drawings.

DRAWINGS

Figure 2:
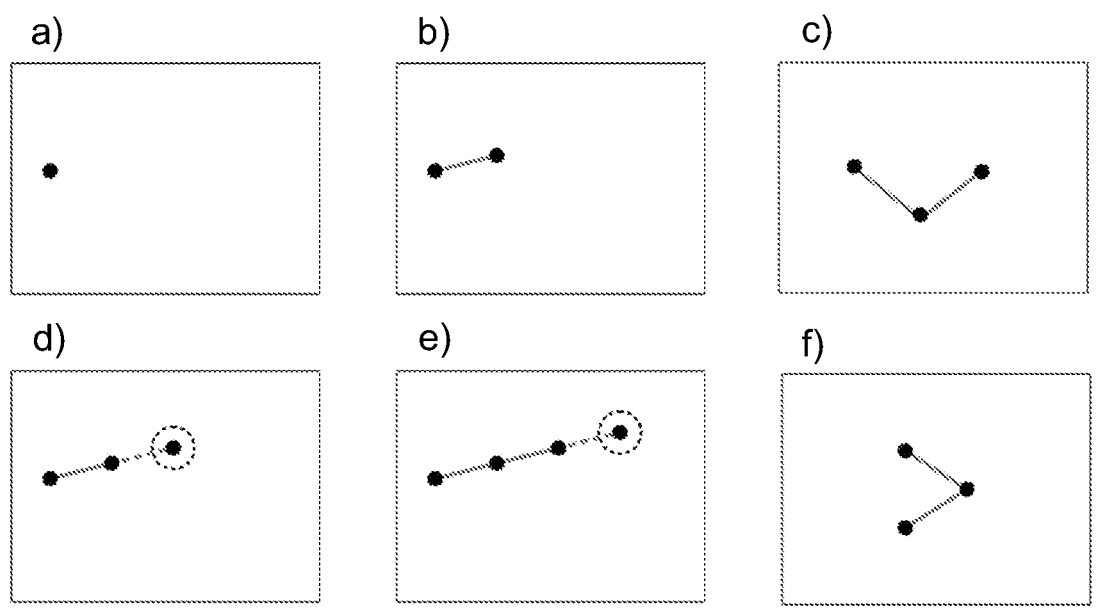
Figure 3:
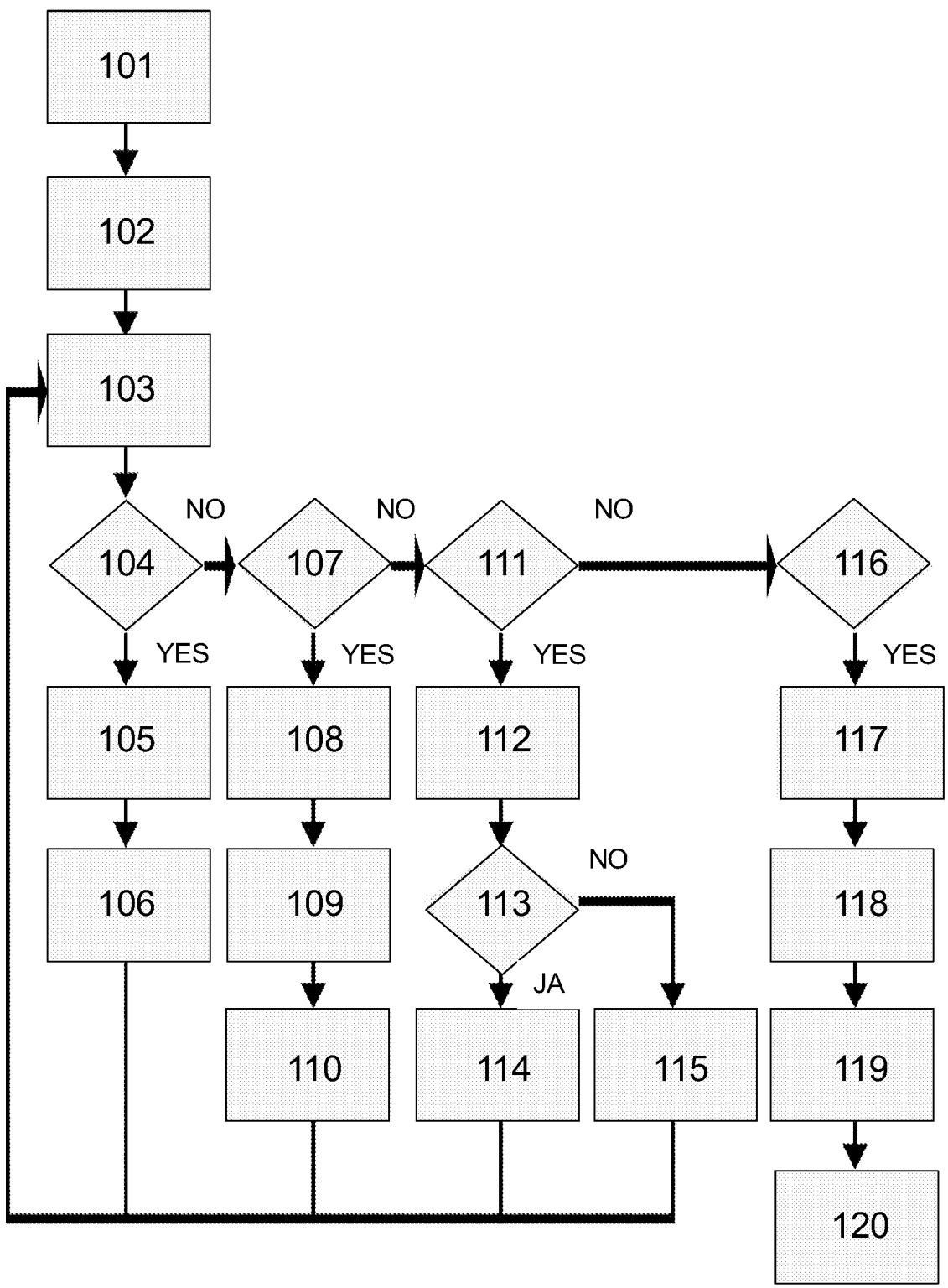
Figure 4:
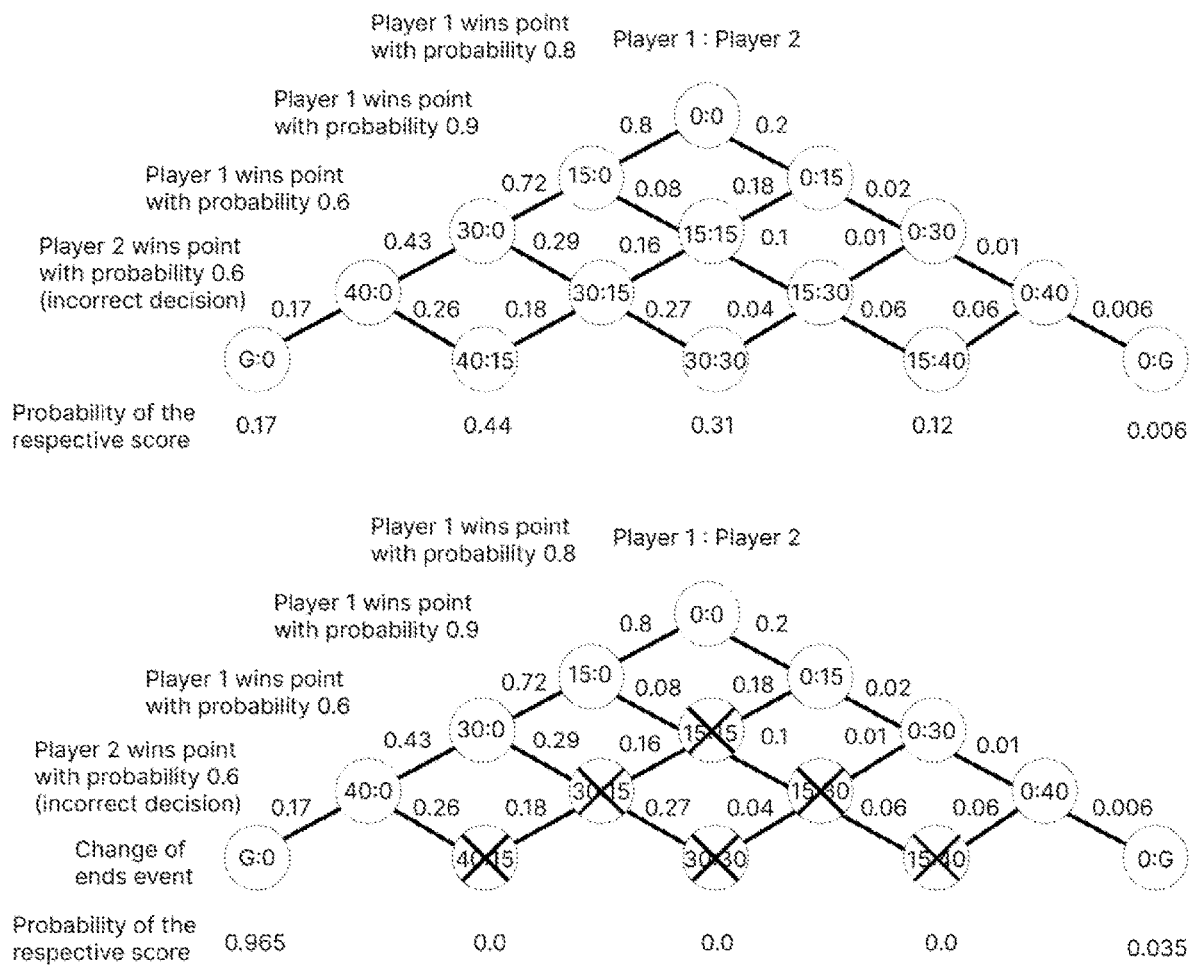

FIG. 1 A schematic illustration of a homography transformation within the field/court recognition FIG. 2 A schematic illustration of trajectory ascertainment a) difference image t; b) difference image t+1; c) hit point; d) difference image t+2; e) difference image t+3; f) stroke FIG. 3 A schematic illustration of a program sequence for a tennis match FIG. 4 Schematic checking for compatibility in the course of the game by means of a scoring tree

DETAILED EXPLANATION OF THE INVENTION

The present invention relates to a method, a device, a computer program and a computer program product for tracking an object on a static playing field/court. The object can be any conceivable object in a game, such as, for example, a handball, a soccer ball, a tennis ball, a shuttlecock or the like. In one preferred embodiment of the present invention, a ball used in a racket sport is involved. In one particularly preferred embodiment, the ball game is tennis.

Hereinafter, in order to simplify the description, the invention is explained with regard to a game of tennis encompassing a tennis court, a tennis ball, a tennis player and a tennis racket. However, this is representative of other types of sport encompassing a playing field/court, at least one player and an object, such as a ball, for example. Furthermore, the use of "a/an" or "one" is used to describe one or more elements, components, steps, modules and/or things. These terms should be interpreted such that they encompass one or at least one and the singular also encompasses the plural, unless the contrary is obviously meant.

The invention relates to a method for tracking a person and/or object on a playing field/court. In this case, the method comprises the steps of field/court recognition, person recognition, object recognition, trajectory recognition, event recognition and backward scoring. These steps are explained in greater detail below and are carried out on suitable means, such as a data processing system or a computer, for example.

The field/court recognition, i.e. the determination or initialization of the playing field/court, serves for calibration in order that the information from two-dimensional (2D) image recordings can be projected into another two-dimensional (2D) image, the playing field/court model. Said information comprises for example hit points and/or whereabouts of at least one player. In one preferred embodiment of the present invention, the calibration is effected by way of a homography matrix. The latter describes the translation, rotation and distortion of one and the same planar surface, e.g. the playing field/court, in two arbitrary images. The homography matrix is calculated by using preferably at least four points from the image recording which correlate with four points in the model image. Preferably, use is made of the four corner points of the individual field/court, for example in tennis, which either were selected beforehand by the user or were calculated by means of image processing methods. Customary methods of image processing or from machine learning can be involved here. One example from image processing would be e.g. edge detection, in which demarcations between different areas (e.g. line on a playing field/court) can be recognized within an image with the aid of various mathematical operators (edge filters) such as e.g. a Laplacian filter, a Sobel operator, a Scharr operator. The corner points of the playing field/court can then be calculated by calculating the points of intersection of recognized lines. One exemplary method from machine learning would be a convolutional neural network (CNN), for which a previously classified data set must in turn be available. A convolutional neural network is a network of neurons which is based on the biological functioning of a brain and is implemented at the machine level. In this case, localized features are extracted from input images and the latter convolve image fields by means of filters. The input to a convolutional layer is an m x m x r image, wherein m is the height and width of the image and r is the number of channels. By way of example, an RGB image has r=3 channels. These data are transferred by a plurality of layers and repeatedly refiltered and undersampled.

In a further step of the present invention, persons situated on the playing field/court are identified. The terms players, participants, persons and/or humans are used interchangeably in the description and denote all humans or non-humans, such as animals, situated on the playing field/court. This is in contrast to the objects, which are inanimate objects. The recognition of at least one player or other participant is effected with the aid of a so-called background subtraction method. This subtractor serves for separating objects in the foreground from objects in the background of an image and for checking the objects with regard to their shape. In order to create a background model for the background subtraction, at least one image of the empty playing field/court is recorded. The further step involves using this background image, i.e. the empty playing field/court, to effect initialization using the known "Mixture of Gaussians Background Subtractor" and calculating a background model. This technique assumes that the intensity values of each pixel in the video can be modelled by means of the "Mixture of Gaussians" method. A simple heuristic determines which intensities are most likely to be in the background. The pixels which do not correspond to them then become the foreground pixels. Preferably, for calculating and modelling the background, a plurality of images recorded by the image system are used to update the background. In one preferred embodiment, an update is effected after every 20 recorded image data, wherein continuous differences between the current image and the background model are incorporated into the background model. This ensures that constant changes in the background are not detected as foreground and thus potentially as humans.

For person recognition, in one embodiment of the present invention, a separation of the foreground image and background image is carried out for each image generated by the image recording system. This gives rise to a foreground mask, which is particularly preferably characterized in that all pixels belonging to the foreground have the value 255 and the pixels of the background have the value 0. In order to achieve this, the absolute difference between the background model and the currently recorded image of the image recording system is calculated by a computer. The use of the absolute difference allows the differences between two images to be reproduced, wherein the absolute difference indicates the absolute value of the difference between two images. In one preferred embodiment, pixels for which the difference is greater than a defined limit value are recorded as foreground. In this case, pixels with a smaller difference are regarded as background. The extracted objects from the foreground mask are potential humans. By means of a collection of data contained on the computer or some other medium and/or correlating with data on the Internet, the objects are examined and/or compared on the basis of their height, width, area and/or position in the image and are classified as human or non-human.

In the following method, the homography matrix generated in the field/court recognition and the bottommost pixel of a human or non-human, said pixel being classified in the object recognition, are used to ascertain the position at which the object is situated in the 2D model of the playing field.

Besides object recognition, in a further step of the present invention, objects on the playing field/court are detected by means of the image recording system. The term "objects" is used interchangeably with the terms "ball" or "ball object" and encompasses all suitable objects which are used in the same way as a ball, for example in games that involve returning the ball, games that involve scoring goals and/or games that involve striking the ball. The object here does not require a specific shape, but rather is dependent on its suitability. Objects or balls encompass but are not restricted to the following listing: tennis balls, shuttlecocks, flying disks, soccer balls, volleyballs, inter alia. Accordingly, the ball can be round, oval, disk-shaped or ring-shaped, equipped with grips or flight stabilizers (feathers), braided, perforated, provided with a movable filling, hollow or solid.

In order to detect the movement of the balls, movements in images of the image recording system are examined. This is done by creating difference images in respect of successive images from the image recording system, which makes it possible to detect movement-dictated changes between the images. In order to be able to recognize the object against different backgrounds, one embodiment involves creating absolute difference images between successive images. When the ball moves through the field of view of the image recording system, it moves past different backgrounds, which may be brighter, such as lamps, sun, for example, or darker, such as floor or walls, for example, than the ball. With the aid of the absolute differences, a movement is always made visible at two places in the difference image. These places are preferably a first position, at which the ball was situated in the previous image, and a second position, at which the ball is situated in the current image. Accordingly, the disappearance of the ball on a first image and its appearance are detected.

One embodiment involves preferably capturing the exclusive movement on a current image at the point in time t=1 (image 1 hereinafter). For this purpose, firstly all movements, i.e. the appearance and the disappearance of the ball, are ascertained. The ascertaining is effected in a first step by generating a difference image between an initial image (image 0 hereinafter) and image 1. The disappearance of the ball from a first position in image 0, at which the ball was situated, and the appearance of the ball in image 1 in a second position, at which the ball is situated, are recognized as a result. A further embodiment involves generating a second difference image (difference image 2) between image 1 and a second image (image 2 hereinafter). The differential image 2 detects the disappearance of the ball from image 1 to image 2 and the appearance of the ball on image 2.

In a further step of object recognition, movement masks are generated for one first and the one second difference image, said movement masks being identified hereinafter as movement mask 1 and movement mask 2. In these movement masks, all pixels for which the value of the absolute differences lies above a defined threshold value acquire the value 255. All pixels that lie below the defined threshold value acquire the value 0. In this case, a predefined value, such as a predefined threshold value, for example, is a fixed value and/or a value that is determined at an arbitrary point in time before a calculation that compares a specific value with the predefined value is carried out. Accordingly, movements in the movement masks and the pixels corresponding to them have the value 255. In the following step, a final movement mask (movement mask 3) is generated. This final movement mask 3 contains the movements that appear in the one first movement mask 1 and in the one second movement mask 2. In one preferred embodiment of the present invention, the final movement mask is created using a logic adding of the individual pixels of both movement masks, preferably by means of a bitwise AND operator. Such a final movement mask 3 makes it possible to extract potential objects, such as balls. In one preferred embodiment, for the extracted ball objects a decision is taken as to whether they are situated within or outside a recognized human. This has a particular importance in trajectory recognition, in particular, since the movement of potential objects within a recognized human is usually effected by the human and not the object, for example the ball.

In a further embodiment of the present invention, the trajectory or the trajectory of the object is ascertained. It is assumed here that the object can start a trajectory and also continue a trajectory. All potential objects detected as not within a recognized human by the image recording system and/or the image processing system are fixed here as potential starting points of a new trajectory. In a next step, these potentially fixed starting points are combined with all potential objects of the temporally following image.

By way of example, the ball objects A and B recorded in a first image are ascertained. Accordingly, the associated trajectories 1(A) and 2(B) are generated. The two potential ball objects C and D are ascertained in a second image. On the basis of the trajectories generated in the second image, the following trajectories are generated: 1(A, C), 2 (A, D), 3 (B, C), 4(B, D). In one particularly preferred embodiment, two further trajectories 5(C) and 6(D) are generated since, as described above, each object is permitted to start a new trajectory.

In a following step for recognizing the trajectory, each potential ball object is checked as to whether it continues an already existing trajectory with two or more ball objects. In order to carry out such checking of the trajectory trajectories, positions of the ball on successive images are ascertained and compared with the existing trajectory that was defined by means of one first and one second starting point. The checking is preferably additionally effected using data concerning the flight direction of the ball in space and/or the acceleration thereof. These data, i.e. the flight direction and acceleration, can be calculated by the juxtaposition of three object points and thus make it possible to predict the position of the following ball object in the image. Each ball situated in the vicinity of the predicted position ascertained is added here to the calculated trajectory until the latter has a starting point and an end point.

In one particularly preferred embodiment, ball objects which are ascertained within the human, i.e. the pixels of which correlate with the pixels of a human, are not used to create new trajectories, since, as already explained above, a movement situated there may, under certain circumstances, be caused by the human himself/herself and the latter's movement, and not by the object, that is to say the ball itself. However, ball objects in such positions, i.e. in the correlative region of recognized humans, can be used when ascertaining the trajectory, i.e. for the trajectory continuation and the prediction thereof.

The creation of new trajectories for each potential ball object identified results in numerous potential trajectories, among which numerous trajectories are present multiplied. In order to prevent this redundancy, in one embodiment of the present invention, a check is carried out after each processed image. In the course of such a check, identical or similar trajectories are ascertained, recognized and then deleted from the computational data. In one preferred embodiment of the present invention, trajectories with fewer than eight ascertained ball positions, preferably with fewer than six, particularly preferably with fewer than four, ascertained ball positions, are additionally deleted from the computational data as well. Deleting the data sets with a small number of actually ascertained ball positions reduces noise which, under certain circumstances, could result in corrupted actual trajectory ascertainment.

After complete detection of a plurality of trajectories, which may differ in terms of their type, said trajectories are classified in one embodiment of the present invention. The classification is effected depending on the type of sport. In this case, preferably data sets of trajectory paths and trajectories that are customary in the type of sport are stored and compared with the ascertained trajectories from the image recording system. In the example of the sport of tennis, the trajectories are classified into different classes such as stroke, serve, hit point, over net, end of rally, etc. The terms "classification" or "characterization" are used interchangeably here and in this case describe the identification of a trajectory according to type, trajectory and optionally event, such as, for example, the serve, a penalty kick or a free throw. A trajectory (K1 hereinafter) is classified by a trajectory that succeeds it being determined. In order to determine the trajectory following K1, at least one trajectory ascertained after K1 is checked and the trajectory determined as an associated successor trajectory (K2) is checked, preferably all trajectories following K1 are checked as a potential associated successor trajectory (K2') of K1. In one preferred embodiment, all trajectories (K2') are checked which begin at a later point in time, but fewer than 30 images later. In one particularly preferred embodiment, the trajectory which in spatial and temporal combination is at the smallest distance from K1 is defined as an associated successor trajectory K2.

In one embodiment, an associated predecessor trajectory (K1) is additionally ascertained for the successor trajectory (K2) under the same criteria as explained above for the successor trajectory K2. Such a correlation of the trajectories prevents trajectories generated on other playing fields/courts from being characterized as a trajectory of the correct playing field/court.

After a corresponding correlation of trajectories K1 and K2, i.e. K1 was determined as a predecessor for K2, and conversely K2 was determined as a successor for K1, for the following characterization, directions, direction changes and/or angles between the trajectories are captured and compared with defined patterns from a database. A corresponding database here can be the combination of dedicated sets of data which are stored internally (locally) on the system or are established externally on storage media. Furthermore, such a database can also be retrieved in a cloud-based storage means, in a network or on the Internet.

In one embodiment of the present invention, the trajectories ascertained and determined by the image recording system and processing system are used for defining events in the game. In this case, individual events in the entire course of the game are determined and classified. The events in the course of the game encompass but are not limited to the following enumeration: beginning and end of each rally or of a game, change of serving end or players' change of ends, end of set and beginning of a tiebreak, free kick, penalty kick, free throw, pitch, strike, fowl, inter alia. As already explained above, the event recognition will be explained on the basis of a game of tennis for simplification. The events are also referred to as triggering events. These triggering events are stored within a database and categorized within the latter.

The beginning of a rally is characterized by one player serving, for which reason event recognition waits for a trajectory that was characterized as a serve. When this serve trajectory occurs, firstly a check is made, by way of the standing position of the associated player, as to whether the serve was detected on the correct place on the tennis court and then where the two players were situated at the time of the serve. Such position recognition for the players is effected here with the aid of the image recording system and the object recognition already described above. In a further embodiment, this local information of the players subsequently provides information, with regard to the score, as to whether the current score can be associated with even or odd games and for the statistics as to whether a second serve is involved (two serves owing to the same position). After such a rally start has been recognized, further events in the game are ascertained in one preferred embodiment. Said further events may be for example a hit point after a serve. Such a hit point in tennis must be situated in a different part of the court depending on the position of the serving player. This hit point or this event provides information about whether it is probable that a second serve will follow. In one preferred embodiment, for each event ascertained, a check is made as to whether this event occurred on the correct playing field/court and/or whether it occurred within the playing field/court, i.e. the playing field/court lines. Such an ascertainment as to whether the event took place within or outside the playing field/court region, the ball and/or player position is correlated with the field/court data ascertained. In one preferred embodiment, the distance between the recognized hit point and the lines delimiting the playing field/court is additionally taken as a basis for acquiring a probability with which the decision of the system was taken correctly. The closer the hit point is to the lines, the lower the probability in this case.

In one embodiment of the present invention, the events and position of the players and balls are recognized in the playing field/court mode, wherein the hit points and standing positions are transformed into the plane of the tennis court model with the aid of the homography matrix determined in the calibration. Events such as, for example, balls flying over the net and the end of the rally preferably also undergo a check to ascertain whether the associated player is situated in the correct zone. Furthermore, in one preferred embodiment, strokes are characterized according to a data set. This data set for strokes can comprise general local databases, external information from networks or the Internet or a self-generating collection of data. Preferably, the data set for strokes is a collection of data which has been extracted from previous recordings and categorized. The data can be extracted both to local storage media and to storage media in local networks or on the Internet.

Such a collection of data additionally stores events, such as a change of serving end, for example, which always takes place at the beginning of a new game and constitutes a game-ending event. In addition, this event can be confirmed by virtue of the fact that a player who did not perform the previous serves performs a plurality of serves successively. These game-influencing events are also referred to as triggering events. The same applies to changes of ends, which likewise constitute a game-ending event. In addition, in one embodiment of the present invention, all events can be identified and thereby characterized by a player or a third person independently by inputting. Such inputting by the user can lead, in an automated manner, to an updating of the collections of data stored in the database. Furthermore, in a further embodiment, elements can be provided which enable manual inputting of an event, such as the end of a match, for example. By way of example, remote controls, smartphones, buttons, touchscreens or other devices can be provided for this purpose.

In one embodiment of the present invention, a result tree, a so-called "scoring tree", is generated. Said result tree is generated on the basis of data from results in the game and the course of the game. The scoring tree is created by means of a computer and stored on a suitable storage medium. In this case, suitable storage media comprise internal and external storage means, such as, for example, cloud storage means, network storage means and/or hard disk storage means. Each event generates in the scoring tree a corresponding data set defining the event. On the basis of this event and preferably with consultation of the conditions, the potential further course of the game is ascertained. The latter can be displayed on devices suitable therefor, such as smartphones, screens, computers, laptops, tablets and similar devices. After the match has ended, the scoring tree thus contains all potential scores at every point in time in the game, wherein each score has a probability that describes its plausibility. A check for the compatibility of all possible scores with the detected events is effected. This involves checking whether a score is actually possible against the background of the detected events. FIG. 4 shows by way of example on the basis of a course of the game in tennis how firstly the events present in the scoring tree are checked for compatibility with the event "change of ends" and then the plausibility of the remaining scores is calculated on the basis of the remaining probability. In this case, plausibility describes the coherence or correctness of the statements and serves as a criterion for assessment between the real values ascertained and the calculated values. Through the course of the match and the events covering therein, in one embodiment, the potentially possible scores are delimited in real time and the result of the end of the game is corrected accordingly. In the case of events with regard to the change of ends in tennis, for example, only an odd number of ended games is possible, such as 0:1, 2:1, 0:3 etc. In the case of a change of serving end, by contrast, for example only an even number of ended games is possible, such as 0:2, 1:1, 4:0 etc. In one preferred embodiment of the present invention, potential scores which do not meet the conditions of a real event on the playing field/court are therefore deleted from the scoring tree. Corresponding further potential scores are adapted in the ratio of the probabilities after the process of deletion, such that the total probability gives 100%. The advantage of this method is that the result of the game is no longer dependent on the individual decisions at the level of points, but rather can be corrected afterward by means of the key events. In one particularly preferred embodiment, the course of the game is registered as "incorrect" by the system only if the majority of the individual decisions is incorrect. A majority is more than 50% of the decisions, preferably more than 60% of the decisions, particularly preferably more than 70%.

In one embodiment, with regard to recognizing the field/court, the at least one person, the at least one object, the trajectories and the events on the playing field/court and also backward scoring, the automatic tracking method captures point-accurate scores for which associated statistics such as, for example, error, winner, ace or double fault can be recognized and associated with the player position and the type of stroke. In one embodiment of the invention, the method comprises commands, the following steps: a) determining an event A; b) correlating the event with the player position and/or with the type of stroke; c) communicating the data to an imaging device.

In one embodiment of the present invention, all image information data are extracted from just one video image, that is to say that each image information point is recorded by a single camera. A three-dimensional model is not necessary for this. In order to be able to reliably recognize the diverse events, such as strokes in tennis, for example, different images and/or perspectives are usually necessary in order to determine a specific type, such as forehand, backhand, serve, volley, topspin, flat or slice. In order to circumvent this necessity, one embodiment involves creating a database with images of already categorized events, such as in tennis, for example, of tennis strokes from a camera with a predetermined position. The resulting pixels and data with specified positioning are categorized with the associated strokes in a next step. The data generated therefrom are used to create a so-called convolutional neural network (CNN), i.e. an artificial neural network. In the case of this CNN, the input into the network is effected by way of pixels which are stored in a specific point in a specific neuron. These artificial generated neurons are interconnected to form an artificial neural network, such that they can exchange messages among one another. The connections of the neurons and/or networks have a numerical weighting that is adapted during the coining process, such that a correctly trained network reacts correctly in the case of an image or pattern to be recognized; in this respect, see for example Bengio, Y & Lecun, Yann. (1997), Convolutional Networks for Images, Speech, and Time-Series, as already described above.

With the aid of the generated data and the simple recognition with the aid of just one image or one video from a single camera position, networked playing fields/courts can be produced within a very short time and allow the player to acquire match statistics, point-by-point video analyses and/or personal coaching on the basis of the actual course of the game. In order to represent the correct course of the game, as explained above, decisions are dependent on the behavior of the player and the associated object, or ball, and are not merely calculated by a system. The system described is therefore able to generate correct, point-based statistics, even if the decisions of player and system initially differ.

In one embodiment of the present invention, the generated data are transmitted to one or more devices, which can comprise, but are not restricted to, smartphones, tablets, screens, monitors, televisions, and/or computers. In order to provide individual training, in one preferred embodiment of the present invention, there are situated at each playing field/court in each case codes specific therefor, which can be scanned for example with the aid of a smartphone or an associated application (App) installed thereon. With this the player can log on to the field/court, use the latter and cause his/her data to be analyzed. For this purpose, in one embodiment, after the match the data are uploaded to an external storage means, in which the player can view said data. Said storage means can be a cloud-based service, a network, a smartphone, a computer or similar devices or combinations that are suitable for storing and reproducing the data.

The data for the method demonstrated above are generated with the aid of a device comprising an image recording system. Said image recording system consists of at least one camera arranged in such a way that the entire playing field/court is captured. As a result, image data from the entire playing field/court can be generated and determined. In one preferred embodiment, the image data are extracted from two cameras, wherein one camera is directed at a first side of the playing field/court, for example at the left side of the playing field/court, and the second camera is directed at a second side of the playing field/court, for example the right-hand half of the court.

The at least one camera is mounted at a predetermined location. The location is preferably the net posts in which the camera is arranged in an integrated manner. In a further embodiment, a camera, such as a network camera, for example, can additionally be provided. Said camera can be arranged behind the baseline, for example. This additional video material can be acquired for later analyses by player and trainer.

The data of the at least one camera are communicated to a computing module and/or a storage means by means of a transmission module. The transmission module can be a wired or wireless connection. In one preferred embodiment, a wired variant is involved.

In this case, the computing unit comprises modules that perform steps of the method explained above. The computing unit therefore comprises at least one module for playing field/court ascertainment, at least one module for person recognition, at least one module for object determination, at least one module for trajectory recognition, at least one module for event identification, and at least one module for event-based result ascertainment.

In this case, the at least one module for playing field/court ascertainment determines the position, size and dimensions of the playing field/court. For this purpose, firstly image data of at least one camera are transmitted to the module by a transmission unit. In a further step, a calibration is carried out within the field/court recognition module, wherein individual points in a two-dimensional (2D) image are assigned to a specific point in a two-dimensional (2D) model of the playing field/court, as can be gathered from FIG. 1, for example. The calibration is preferably effected by way of a homography matrix in which at least four points are used which correlate in the image and the model, these particularly preferably being four corner points of the playing field/court.

The at least one module for recognizing persons on the playing field/court determines players or other objects on the playing field/court, as already described with regard to the method. For this purpose, firstly image data of at least one camera are transmitted to the module by a transmission unit. A further step involves generating at least one background image of an empty playing field/court. The following step involves creating a background model. For this purpose, firstly at least one image of the empty playing field/court is recorded. In the further step, using this background image, i.e. the empty playing field/court, initialization is effected using the known "Mixture of Gaussians Background Subtractor" and a background model is calculated, which is regularly updated over the duration of the run time of the method. Said subtractor is used to separate objects in the foreground and background of an image and to carry out a check with regard to their shape. The separation in each newly recorded image is effected by forming the absolute difference with the background model. The generated data are used to create a foreground mask. In one preferred embodiment, it has the property that all pixels belonging to the foreground have the value 255 and the pixels of the background have the value 0, wherein preferably pixels for which the difference is greater than a defined limit value are determined as foreground and pixels with a smaller difference are determined as background.

The at least one module for recognizing objects, such as balls, for example, on the playing field/court identifies movements on each recorded image. In this case, firstly image data from a camera have to be communicated to the object recognition module via the transmission module or a previous module. The following steps involve firstly creating difference images in respect of successive images and calculating therefrom absolute difference images, in which a movement is visible at two places in the difference image. In one preferred embodiment, the two places are a first position, at which the ball was situated in the previous image, and a second position, at which the ball is situated in the current image. This is followed by generating a first movement mask for the one first difference image and a second movement mask for the one second difference image. These masks are used for ascertaining a final movement mask that combines both movements. The individual pixels of both movement masks are preferably added by a bitwise AND operator.

The module for trajectory recognition, like the modules before, uses image data from at least one camera which were communicated to this module by means of a previous module or the transmission module. In this case, firstly potential starting points of a trajectory are defined. They are combined with all potential objects of the temporally following image and a check is made for each object as to whether an already existing trajectory is continued. These data are taken as a basis for ascertaining positions of the object on successive images. In the subsequent step, the two trajectories are compared with one another and the trajectory course is determined. The trajectory is classified on the basis of said trajectory course, preferably taking account of the next trajectory of the object that follows the trajectory. In one preferred embodiment, pixels of objects which correlate with pixels of persons are not taken into account.

The module for identifying events in the course of the game compares the at least one position of at least one person and one object with the playing field/court model. For this purpose, the module communicates with one of the previous modules and/or a storage means to which said one of the preceding modules has transmitted data ascertained and which has stored the latter. On the basis of these data, the module for identifying events correlates them with databases in order to identify the event. For this purpose, the module can communicate with a multiplicity of databases or information storage means to which it is connected. In one embodiment, artificial intelligences trained in advance are additionally used to classify the events. In one preferred embodiment, said intelligences are a convolutional neural network (CNN).

The module for event-oriented result capture in the present device corrects the score calculated in the course of the game by means of checking the possibilities of all possible scores with the real events recognized by the previous modules. For this purpose, the modules are connected to one another directly or indirectly and/or the acquisition of data for the required information is effected by way of a storage means that saves all generated data from one of the previous modules. In one preferred embodiment, potential scores are adapted in the ratio of the probabilities, such that the total probability gives 100%.

The above-described method or at least part of this method for object tracking on a playing field/court comprising field/court recognition, object recognition, trajectory recognition, event recognition and backward scoring is implemented on the computing module, such as a computer, for example. Therefore, the present invention furthermore relates to a computer program for carrying out a method described above when the computer program is executed on a computer.

When the method is implemented, at least some of the steps belonging to the method are carried out by a processor by the execution of instructions. In a further embodiment, instructions or some of the instructions for carrying out the method described and/or for implementing the method described in a system can be stored on a non-transitory, computer-readable data carrier.

The device of the present invention can comprise a multiplicity of identical and/or different modules. "Components" or "functional units" are also referred to as modules. Furthermore, modules and/or components can also be "computer-executed" and/or "computer-implemented". In this case, the modules are implemented in the context of a computer system that typically comprises a processor and a storage means. In general, a module is a component of a system that performs specific operations for the implementation of a specific functionality. Examples of functionalities include the reception of measured values (such as image data, for example) or the calculation of the field/court by means of a calculation module. However, the modules can also have further functionalities described in the above embodiments concerning the method.

The term "module" here encompasses a tangible entity which is physically constructed, is permanently configured (e.g. hardwired) or is temporarily configured (e.g. programmed) to operate in a specific way or to perform specific operations described herein. In embodiments in which the modules are temporarily configured (e.g. programmed), not every module need be configured or instantiated at every point in time. By way of example, a general processor can be configured in such a way that it implements different modules at varying times. In some embodiments, a processor implements a module by executing instructions which implement at least part of the functionality of the module. Optionally, a storage means can store the instructions (e.g. as computer code) which are read by the processor and processed and have the effect that the processor performs at least some operations involved in the implementation of the functionality of the module.

Additionally or alternatively, in one embodiment, a storage means that can comprise one or more storage devices can store data which are read and processed by the processor in order to implement at least part of the functionality of the module. In a further embodiment, the storage means can comprise one or more hardware elements which can store information that is accessible for a processor. In one embodiment, the storage means can be situated at least partly as a part of the processor or on the same chip as the processor and/or can be a material element separate from the processor.

In one embodiment, the at least one processor executes instructions which are stored on the storage means and which perform operations involved in the implementation of the functionality of a specific module. The at least one processor can additionally operate in such a way that the performance of the relevant operations is supported in an environment with "Cloud Computing" or as "Software-as-a-Service" (SaaS). By way of example, at least some of the operations involved in the implementation of a module can be performed by a group of computers which are accessible via a network such as, for example, the Internet and/or via one or more corresponding interfaces, such as application programming interfaces (API). Optionally, some of the modules can be implemented in a distributed manner among a plurality of processors. In one embodiment, the at least one processor can be situated at one geographical location or can be distributed among a plurality of geographical locations. Optionally, some modules can comprise the execution of instructions on devices which belong to the users and/or are situated alongside the players or spectators. By way of example, methods which comprise a presentation of results, for example, can be implemented partly or completely on processors that belong to devices of the players. Said devices are for example laptops, tablets, smartphones, but this listing is not limited to the devices listed, but rather can encompass any known device. Furthermore, in one embodiment, data can be uploaded to cloud-based servers. In some embodiments, modules can provide information to other modules and/or receive information from other modules. Accordingly, such modules can be regarded as communicatively coupled. If a plurality of such modules are present simultaneously, communications can be achieved by means of signal transmission. In embodiments in which modules are configured or instantiated at different times, communications between such modules can be achieved for example by the storage and retrieval of information in storage structures that can be accessed by a plurality of modules. In one embodiment, one module can perform an operation and store the output of this operation on a storage device to which it is communicatively coupled. Another module can then access the storage device at a later point in time in order to retrieve and process the stored output.

In this connection, the present invention furthermore relates to a computer program product comprising a storage medium, on which is stored a computer program that comprises the above-described method for game monitoring comprising field/court recognition, person recognition, object recognition, trajectory recognition, event recognition and backward scoring. In one preferred embodiment, the computer product is loaded directly into the internal memory of a digital computer and comprises software code sections that perform the steps of game monitoring when the product runs on a computer. In this case, the term computer program product encompasses a computer program stored on a carrier, such as, for example, RAM, ROM, CD, apparatuses and similar devices; an embedded system as a comprehensive system comprising a computer program, such as, for example, an electronic device comprising a computer program; a network of computer-implemented computer programs such as, for example, server systems, client systems, cloud computing systems and the like; and/or computers on which a computer program is loaded, runs, is stored, is executed or is developed.

Although the methods disclosed herein can be described and illustrated with regard to specific steps carried out in a specific order, it should be assumed that these steps can be combined, subdivided and/or rearranged in order to form an equivalent method without departing from the teachings of the embodiments. Accordingly, unless expressly specified herein, the order and grouping of the steps do not constitute any restriction of the embodiments. Furthermore, the methods and mechanisms of the embodiments are described in the singular form in some cases for reasons of clarity. However, some embodiments, unless indicated otherwise, can comprise a plurality of iterations of a method or a plurality of instantiations of a mechanism. If one processor is disclosed in one embodiment, for example, the scope of application of the embodiment is also intended to cover the use of a plurality of processors. Specific features of the embodiments which have possibly been described in the context of separate embodiments for reasons of clarity can additionally be provided in different combinations in a single embodiment. Conversely, different features of the embodiments which have possibly been described in the context of a single embodiment for reasons of space can additionally be provided separately or in any suitable sub-combination.

In a further embodiment, the methods and programs can be implemented with different computer system configurations. These computer systems encompass but are not restricted to cloud computing, client server models, grid computing, peer-to-peer, handheld devices, multiprocessor systems, microprocessor-based systems, programmable consumer electronics, mini computers and/or mainframes. Additionally or alternatively, some of the embodiments can be implemented in a distributed computer environment in which the tasks are carried out by remote processing devices connected via a communication network. In a distributed computer environment, program components can be localized in both local and remote computers and/or storage devices. Additionally or alternatively, some of the embodiments can be implemented in the form of a service such as Infrastructure-as-a-Service (IaaS), Platform-as-a-Service (PaaS), Software-as-a-Service (SaaS) and/or Network-as-a-Service (NaaS).

These and other embodiments of the present invention are disclosed in the description and the examples and are encompassed thereby. The features mentioned in the above description and in the claims are furthermore combinable in any desired selection and the feature combinations that are expedient in the context of the invention should be deemed to be disclosed. Further literature concerning any known materials, methods and applications that can be used in accordance with the present invention can be retrieved from public libraries and databases, for example using electronic devices. A more complete understanding of the invention can be obtained by reference to the figures and examples, which have been provided for illustration purposes and are not intended to restrict the scope of the invention.

EXAMPLES

Example: Program Sequence for Backward Scoring on the Basis of the Example of Tennis FIG. 3 illustrates a program sequence for backward scoring on the basis of the example of a game of tennis. This involves firstly providing a list with detected events (101), which list was generated beforehand by data ascertainment. In the further step (102), an empty scoring tree is initialized. In the latter, the individual events are processed (103). There follows the determination of a rally (104). If a rally has taken place, then the following step (105) involves determining all potential scores which have resulted from this rally. The scoring tree is updated according to the corresponding score and new "leaves" are added (106).

If no rally has taken place, it is determined whether an end of the rally can be determined (107). If an end has occurred, the probability for the outcome of the rally is calculated in the following step (108). The calculated probability is noted (109) at the leaves of the scoring tree and the total probability for each score is updated (110).

If no rally has taken place, it is determined whether an end of the game has taken place (111). If an end has been detected, then all scores with incomplete games are removed from the scoring tree (112). In the next step, the change of ends is identified (113). If a change of ends has taken place, then all scores with an even number of games are removed from the scoring tree (114). However, if no change of ends is detected, all scores with an odd number of games are removed from the scoring tree (115).

If an end of the game has not been determined, a check is made as to whether the match has finished (116). If this is the case, all scores with incomplete games (117) and sets (118) are removed from the scoring tree. The last step involves determining (119) the score with the highest probability as the final score and outputting (120) it as the score.

The invention claimed is:

1. A method for game monitoring comprising the following steps:
   a) determining the playing field/court;
   b) recognizing at least one person on the playing field/court;
   c) identifying objects on the playing field/court;
   d) determining at least one trajectory;
   wherein at least one event is identified by means of which the scores calculated in the course of the game are corrected by means of backward scoring and the real final score of the game is output;
   wherein correcting the score calculated in the course of the game comprises the following steps:
      a) monitoring the possible scores during the game;
      b) checking the compatibility of all possible scores with the detected events;
      c) checking the plausibility of the remaining scores.

2. A method for game monitoring comprising the following steps:
   a) determining the playing field/court;
   b) recognizing at least one person on the playing field/court;
   c) identifying objects on the playing field/court; and
   d) determining at least one trajectory;
   wherein at least one event is identified by means of which the scores calculated in the course of the game are corrected by means of backward scoring and the real final score of the game is output, and
   wherein determining the playing field/court is effected by means of calibration, wherein individual points in a two-dimensional (2D) image are assigned to a specific point in a two-dimensional (2D) model of the playing field/court, wherein the calibration is preferably effected by way of a homography matrix in which at least four points are used which correlate in the image and the model, these particularly preferably being four corner points of the playing field/court.

3. The method as claimed in claim 2, wherein recognizing persons on the playing field/court comprises the following steps:
   a) generating at least one background image of an empty playing field/court;
   b) generating a background model;
   c) separating each background image from each currently recorded image which comprises a person;
   d) determining an absolute difference between the background model and the currently recorded image, and
   e) generating a foreground mask,
   wherein the foreground mask is characterized in that all pixels belonging to the foreground have the value 255 and the pixels of the background have the value 0, wherein preferably pixels for which the difference is greater than a defined limit value are determined as foreground and pixels with a smaller difference are determined as background.

4. The method as claimed in claim 3, wherein the object on the playing field/court is identified by means of movements of each recorded image, wherein determining the movement preferably comprises the following steps:
   a) creating difference images in respect of successive images;
   b) calculating absolute difference images, in which a movement is visible at two places in the difference image, it preferably being a first position, at which the ball was situated in the previous image, and a second position, at which the ball is situated in the current image;
   c) generating a first movement mask for the one first difference image and a second movement mask for the one second difference image; and
   d) generating a final movement mask comprising the movements in the one first movement mask and the one second movement mask; the individual pixels of both movement masks are preferably added by a bitwise AND operator.

5. The method as claimed in claim 4, wherein the trajectory path or the trajectory of the object is ascertained, comprising the following steps:
   a) fixing a first and a second starting point of a potential trajectory;
   b) combining the potentially fixed starting points with all potential objects of the temporally following image;
   c) checking each object as to whether an already existing trajectory is continued;
   d) ascertaining positions of the object on successive images;
   e) comparing the trajectories from a) and d);
   f) determining a trajectory course; and
   g) classifying the trajectory by determining a second trajectory following the first trajectory,
   wherein pixels of objects which correlate with pixels of persons are preferably not taken into account.

6. The method as claimed in claim 5, wherein identifying events in the course of the game comprises the following steps:
   a) capturing a triggering event;
   b) comparing the position of at least one person and one object with the playing field/court model;
   c) correlating with a database,
   wherein the events have preferably been captured in a categorized data set in a previous step in order to carry out the correlating with the aid of an artificial intelligence trained with this data set.

7. The method as claimed in claim 6, wherein correcting the score calculated in the course of the game comprises the following steps:
   d) monitoring the possible scores during the game;
   e) checking the compatibility of all possible scores with the detected events;
   f) checking the plausibility of the remaining scores.

8. A device for tracking at least one object and player on a playing field/court comprising:
   a) an image recording system comprising
      i) at least one camera arranged in such a way that the entire playing field/court is captured;
      ii) at least one transmission module designed to store the data recorded by the camera and/or to transmit them to a computing unit, a storage means, or system;
   wherein the at least one camera and the at least one transmission module are attached to at least one net post;
   b) a computing unit, comprising modules for
      iii) playing field/court ascertainment;
      iv) person recognition;
      v) object determination;
      vi) trajectory recognition;
      vii) event identification; and
      viii) event-based result ascertainment.

* * * * *